United States Patent [19]

St. Clair

[11] 4,348,135

[45] Sep. 7, 1982

[54] DRAINING, IRRIGATING AND AERATION OF SOIL AND HEATING OR COOLING OF SOIL

[76] Inventor: John C. St. Clair, Box 3345, Columbus, Ohio 43210

[21] Appl. No.: 60,214

[22] Filed: Jul. 23, 1979

Related U.S. Application Data

[63] Continuation-in-part of Ser. No. 738,182, Nov. 2, 1976, abandoned, which is a continuation of Ser. No. 593,022, Jul. 3, 1975, abandoned.

[51] Int. Cl.$^3$ .............................................. E02B 11/02
[52] U.S. Cl. ..................................... 405/36; 405/131
[58] Field of Search ..................... 405/36, 37, 43, 130, 405/131, 258; 47/48.5, 58; 165/45

[56] References Cited

U.S. PATENT DOCUMENTS

| | | | |
|---|---|---|---|
| 390,232 | 9/1975 | Watanabe | 405/43 |
| 3,386,251 | 6/1968 | Casagrande et al. | 405/258 |
| 3,908,385 | 9/1975 | Daniel et al. | 405/37 |

Primary Examiner—David H. Corbin

[57] ABSTRACT

Flexible ¼ inch diameter plastic tubing is buried horizontally below the surface of the ground. Water or air is forced in the tubing to expand the tubing and make the cavities, that the tubing is in, ¼ inch in diameter. Then the water or air is sucked out of the tubing so that hollow earth-walled cavities ¼ inch in diameter are left with the plastic tubing occupying only a small fraction of the volume of the cavities. This produces a system of worm holes over the field that will drain excess water after rains. In drouths irrigation water is introduced through the worm holes. Air is blown in the worm holes to aerate the soil at other times, all of which greatly increase plant growth. By guaranteeing that the ground always will be moist the thermal conductivity of the ground will always be near the maximum around the worm holes. Therefore part of the tunes can always be used to pass water through so the water can be cooled or warmed with the ground being used for a source of heat or cooling efficiently. When the worm hole like cavity for drainage is stopped up by pressure of equipment passing over or other causes the tube is blown up again and then deflated.

8 Claims, 2 Drawing Figures

DRAINING, IRRIGATING AND AERATION OF SOIL AND HEATING OR COOLING OF SOIL

This patent is a continuation-in-part of Ser. No. 738,182, later abandoned, Ser. No. 738,182 being a continuation of Ser. No. 593,022 which was filed July 3, 1975, abandoned.

BACKGROUND OF THE INVENTION

The invention pertains to the use, of a very low cost drainage system, also for providing subsurface irrigation and means to aerate the land for growing crops. Also the drainage system provides a very low cost heat transfer system to use the ground as a source of cooling or warming for water used in air conditioning, house heating and industrial uses like power plants.

Previous drainage systems for farm land have been expensive and enormous areas of farm land have not been provided with the optimum amount of drainage for crop production. Subsurface irrigation systems provide irrigation without large evaporation losses of expensive and short irrigation water. But in the past subsurface irrigation systems have been too expensive to provide.

The use of the ground to provide cooling for water used as condenser water for power plants or for water used for air conditioning involves pipes buried below the ground with an enormous problem of transferring heat between the pipe and the ground. By using thin-walled plastic tubing an enormous area for heat transfer can be provided at very low cost, but of equal importance is a means to maintain the conductivity of heat through the soil at a maximum level by a means to guarantee the soil will always be quite moist. Normally the combination of plants growing on the surface of the ground and the heat being released to the ground by the cooling of the water in the pipes will during summer drouths frequently dry out the soil around the pipes and reduce the rate of heat transfer from the pipes as much as two-thirds or more. While an irrigation of the ground with water is an obvious solution usually a reason that one would use buried pipes for cooling is that one is short of cheap irrigation water to start with. So the very efficient use of the irrigation water the invention provides, in which evaporation losses can be greatly reduced, is a great advantage.

There is virtually no prior art for the invention unless one views the art for compacting the soil for foundations of buildings. Casagrande in U.S. Pat. No. 3,386,251 expands flexible membranes to *force* water out of soils for foundations so the soil is strengthened and stabilized.

SUMMARY OF THE INVENTION

The invention is based on the discovery that very low cost small diameter tubes capable of withstanding amazingly high internal pressures can be made out of plastic films. This is due to the internal pressure a cylinder can stand being inversely proportional to the diameter of a cylinder, the strength of the wall of the cylinder being constant. At the same time, while you are being allowed to use thin walled tubing, the fact that the walls needed are thin, makes these small diameter tubes extremely flexible. Stiffness is inversely proportional to thickness of the film. Also stretching processes used for thin films orient molecules to produce maximum strength. The rolling of thin metal films produces the same result. While the use of metal films is not preferred their use in some cases is possible.

Therefore it is practical to supply, at very low cost, tubing that will withstand pressures as high as 400 pounds per square inch internal pressures for the short times needed to expand a deflated tube and force the ground around it into a cavity (similar to a worm hole) capable of draining land. It can be used also as a very low cost way for subsurface irrigaion and for passing air in and aerating the soil for growing crops. During these latter processes the tube is deflated and occupies very little of the total volume of the worm hole. This is because the tube is very thin walled. The walls of the tube are normally under 0.005 inches thick. It is emphasized that in all cases the water drained and any irrigation water applied and any air used for aeration of the soil passes not through the tube but through the cavity, produced by expanding the tube, while the tube is in a deflated condition. The above fluids mentioned pass not in the deflated tube but inside the earth walled cavity or worm hole around the deflated tube.

The fact that the worm hole is of such small diameter seldom makes much difference as to regards to the carrying capacity for drainage or irrigation water since you normally have an existing drainage system so short runs of the worm holes are usually only needed. However in soft soils tubing over an inch in diameter is practical if shallow depths for the tubing are practical. Shallow depths are some times preferred.

The purpose of this invention is to provide extremely good drainage by the use of the very low cost tubes provided. Therefore you will normally put in many more tubes or worm holes per acre than you would do with prior methods of ground drainage.

Also the heat transfer between the ground and a buried tube in any case is poor so there is seldom a reason to pass more than relatively small amounts of water through a tube. What is needed is a very low cost tube, such as provided, so you can use enormous footages of tubes plus the means to keep the soil very moist around tube operating in parallel by intermittently irrigating the soil around the tube as above mentioned.

Also the smaller the tube the better the heat transfer per square foot of surface of the tube and the less the possibility of the tube being closed by pressure above, spalling of the soil into the tube, but not as to settling out of soil in the cavity around the tube.

Growing crops on the enormous expanses of level land, in the Mid-West and on many other smaller expanses of level land in this country has two basic problems. The first is that level land has poor drainage and crops grow poorly in improperly drained land. For instance a recent survey of the level and gently rolling farm land of Western Ohio, which is known as the little Corn Belt, found that 4,800,000 acres needed better drainage.

A second problem of level farm land, which is also shared with about all other farm land, is that cultivation is the only prior method for breaking up the crusts that form between rows of corn and soybeans and prevent the air from penetrating the ground as needed by crops. This cultivation has the disadvantage that it cuts the roots of the crops. Also subsequent rains stir up mud with the rain water filtered out in the ground, filling up the porous spaces in the ground, making the ground harder to drain, and harder for the roots of crops to penetrate it. Recently there has been widely adopted the practice of spraying weed killers on the ground and not cultivating at all. This eliminates the weeds and stops cutting the roots of the crops but it has the big disadvantage of not providing air diffusing into the ground to assist the growing crop.

It is a purpose of this invention to supply very good drainage of farm land at a fraction of putting in tile, plus means for underground irrigation, plus means to aerate crops, plus means to use the drainage system as a means for cooling the water for power plants and air conditioning. This latter also allows for heating, by the condenser water of a power plant, the soil in the spring so that crops planted early in the spring will come up fast before driving rains form a hard crust on the soil. The latter will give crops like corn a very early start and one can raise long season corn that normally produces 20 to 40 bushels of more corn per acre. Larger roots are raised which improves the land at no expense.

DESCRIPTION OF THE PREFERRED EMBODIMENT

Figure 1:
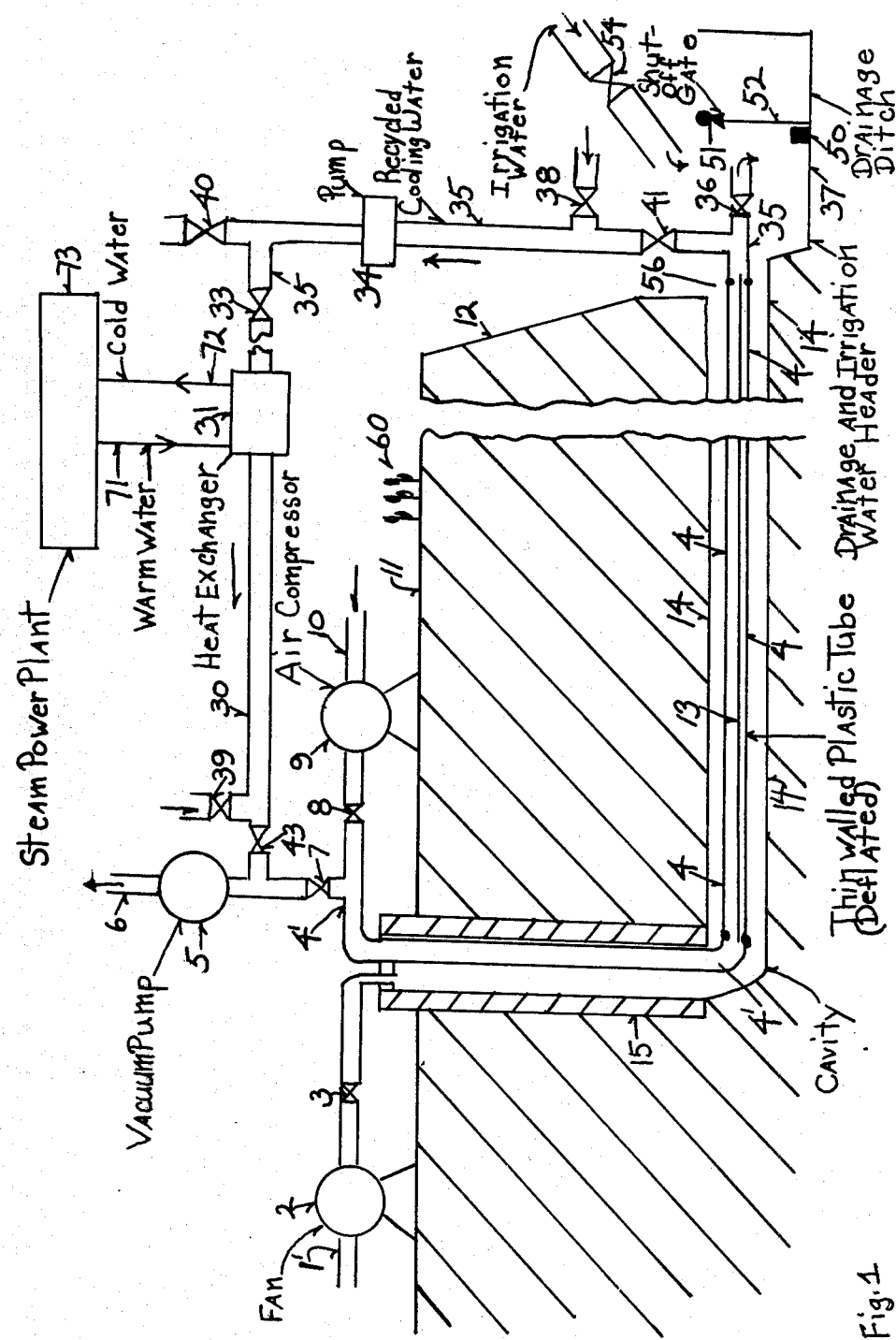
FIG. 1 shows the invention with the tube deflated.

In FIG. 1 of the drawings I show the surface of the ground at 11. There has been buried a flexible tube 4 in the ground. While the depth of the tube may greatly vary it is usually preferred to just put it deep enough so that existing farming operations will not bother it. Normally for a corn field 18 inches deep, which also puts it above existing tile, would be preferred. A farmer could put this in by plowing a deep furrow by first plowing a furrow with the earth thrown to one side and then coming back with his plow set much deeper and throwing the earth the other way. Then he puts the tube in the ditch or rather very deep furrow. In this case the tube probably is best inflated before the ground is pushed back over it but this inflation before burying is optional.

For a home owner, who wants to drain his yard so his children can play without them tracking in mud after rains and wants also to use the buried tubing to cool water for his air conditioning system, all he would have to do is to use a square pointed spade and make a trench 6 inches deep. He would work after rains or after heavy watering and lift the sods carefully off, make his trench, insert the tubing, and refill the trench and the sods. The savings of the water normally used for watering the lawn during droughts would be greatly appreciated by city water works.

Of course shallow installation of the tubing depends on the installer installing the tubing in horizontal contours if he wants to irrigate also.

Of course the professional way to install the tubing would be to install the tubing like the telephone companies use. Small tractors pull plows to plow their telephone wires into the ground and cover up the very narrow slit made in one pass. With these, wires can be plowed in, and also the tubing of this invention, as deep as 5 feet or more.

It is normally preferred to use as small diameter of tubing as is easily available. In this way you get very low cost tubes. Current prices for Mylar (which is a trade mark of DuPont) polyester tubing a 0.25 inch tube requires about 0.78 cents of film per foot to make a tube with 7.5 mils thick Mylar. Mylar has fantastic strength and after sonically sealing, assuming only a 50% efficiency, the tube will stand 450 pounds per square inch internal pressure.

The sonic sealing of very long strips of Mylar film into tubes is done in equipment quoted at from $5000 to $6000 at a rate of 10 to 20 feet per minute. This quotation is by Banson Sonic Power Co. of Banbury, Conn. Making tubing, sonically welded from strip, will be more difficult for diameters under 0.25 inches.

The Mylar film used is roughly the same cost per pound with only a slight increase (15%) as the thickness is decreased to 0.92 mil thickness, so 0.92 mil film walled tubing is only a small fraction of the cost of 7.5 mil film above quoted. (About a seventh of the cost for the film per foot of tubing for the 0.92 mil.) But you run into troubles welding film sonically at thicknesses under one mil.

If we assume that we keep the pressure for expanding the tubing at a constant value, the cost of the tubing per foot decreases by about 60% or more if we halve the diameter of the tubing we make. Therefore if is provided, as this invention does, a demand for $\frac{1}{8}$ inch diameter tubing, specialized sonic welding equipment can be designed and extremely low cost worm holes or cavities can be made. These tubes made of 4 mil polyester film would stand internal pressures of about 400 pounds per square inch internal pressures and have heat transfer coefficients of about 30 to 60 BTU per hour per square foot of surface for a temperature difference of 1° Fahrenheit in moist to water soaked soils. Two tubes would be placed at a foot apart in a trench.

By making tests first on the soil by instruments like "Soil Cone Penetometers" which are described on pages 269–270 of the 1979 edition of the Agricultural Engineers Yearbook, American Society of Agricultural Engineers, St. Joseph, Mich., the softness of the soil while wet and the presence of pebbles can be judged. However I have found that, unless very large areas of land are being drained by my method, it is cheaper to just overdesign by putting in very strong small diameter tubing (like the $\frac{1}{4}$ diameter tubing with 7.5 mil walls mentioned). Extremely deep burying of the tubing, like over 3 feet should also be checked for soil hardness, since so called hard pans may be encountered. But this is rare. The usual requirement of avoiding frost on the tile no longer holds since freezing of water does not damage permanently my system.

Other plastic films of course can be used. Examples are polyethylene and polypropylene. Since the tubing is only stressed during the very short fraction of the time that the cavities or worm holes are expanded the usual objection to high stresses on plastics is avoided. That is plastics, especially plastics other than Mylar (polyester) (Trade Mark of Dupont) tend to lengthen under tensile stresses, too rapidly to be used practially, at stresses far under their breaking point if the stresses are applied for weeks instead of minutes. Also metals may be used though their tendency to corrode under soil conditions limits their use in most soils.

The spacing of the tubes can be widely varied. If only drainage of the land is desired, spacing as far as 20 feet apart in the presence of an undisturbed existing but inefficient conventional drainage system is sufficient. But with the low cost of the installed tubing and the great need for food in the world I prefer to use a spacing as close as 4 feet parallel tubes buried in the ground and even closer. Where the tubes are also used for heat transfer, like cooling the water for steam power plants or air conditioning, spacing as close as 2 feet for parallel tubes is preferred.

The tube 4, as is shown in FIG. 1, is shown with a string 13 inside it. That string helps the deflation of the tube 4 when vacuum pump 5 pumps out air or any other fluid use for deflating the tube. (During deflation of tube 4 valves 3, 8, 36, 41 and 43 are closed and valve 7 open. In cases where the tube 4 is put in the ground with a steady slope downward toward valve 36, just the vacuum of the suction of the flow (if the tube has been inflated with water) will draw the vacuum required. (Note that unless the ground's surface is substantially level, which means with only a small grade downward towards the outlet one rarely puts in drainage systems. Substantially horizontal in this patent means land that is horizontal enough to require drainage of an artificial manner.)

An additional advantage of the string is when the tube is inserted in the ground by the optional method of plowing in the tube. The tube which is in its deflated condition usually, feeds through a hole trailing the plow and is under some stress. This type of equipment that has been primarily designed for installing telephone lines which can withstand stress may put too much stress on a plastic tube unless the plow type equipment is redesigned. The use of a string, which may be a polypropylene cord, may be necessary, if conventional telephone plowing in equipment is used, to withstand stresses on the tube.

The inflation of tube 4 is done by air compressor 9 in the drawing. Air entering by pipe 10 from the atmosphere is forced by air compressor 9 through open valves 8, pipe 4' and into tube 4 with valves 7, 36 and 41 closed. Of course water is also convenient to use for inflating the tube. Farmers all have high pressure compressors to force air or liquids for things like spraying weed killers, or disinfectants over hog pens, which operate off power take-offs on their tractors.

After inflating the tube 4 and expanding the cavity 14 the tube 4 is deflated as previously mentioned.

The pipe 4' comes to the surface inside of clay tile or metal pipe 15. This is sealed at its upper end to permit air at 1' to be slowly introduced by fan 2 through open valved pipe line 3 down pipe 15 and into the cavity 14 around now deflated tube 4. This air flow only needs to be very slow and closing the outlet 56 of cavity or worm hole 14 by a device like a trap to prevent air flow wasted flowing out outlet 56 is rarely necessary. In this way a crop like corn or grass shown at 60 is aerated. These crops or plants require nitrogen fertilizer and if the ground in the summer lacks oxygen more than a day or so a farmer or lawn owner loses his nitrogen to bacteria which use the nitrate form of nitrogen as a source of oxygen.

After rains excess water in the soil and from puddles on the surface of the ground flows through the ground into the cavity or worm hole 14 and out the outlet of the cavity 56 in drainage and irrigation water header 37. When the shut-off gate 52 is swung open the water drains into the drainage ditch 53. The shut-off gate 52 swings on pivot 51 and seats against seat 50.

A very important advantage of this invention is the ability to very efficiently provide underground irrigation at very low cost. Normally irrigation in the Corn Belt has its problems because of the natural poor drainage of the soil. All instructions on irrigation for the Corn Belt say you must provide very good drainage before you consider irrigation. You irrigate and then you have a heavy rain and then without very good drainage you are in bad trouble.

But more important is that there is seldom plentiful irrigation water convenient since the level nature of the land, storage of the irrigation water is expensive. The streams depend very little on springs. The result is that when you have a drouth and badly need irrigation water the streams are about dry. Wells can be expensive unless you are close to large underground gravel formations and you can pump very rapidly when you need the water. And you do not have to depend on storage to let your pumps run more than short times to get the water you need.

A large percentage of water is lost normally from rain fall and from irrigation due to evaporation. Trickle irrigation reduces that evaporation loss by having a very small stream of water applied directly to the ground at just the roots of each plant or tree. The method of the invention even reduces that evaporation farther by applying it to under the surface of the ground.

When irrigation is provided by the invention, shut-off gate 52 is closed as is shown in the drawing and irrigation water is introduced through valved pipe line 54 into drainage and irrigation water header 37. The water flows into cavity or worm hole 14 and wets the ground around cavity or worm hole 14. By controlling the level of the water in drainage and irrigation header 37 the level of moisture in the ground 11 can be controlled.

Figure 2:
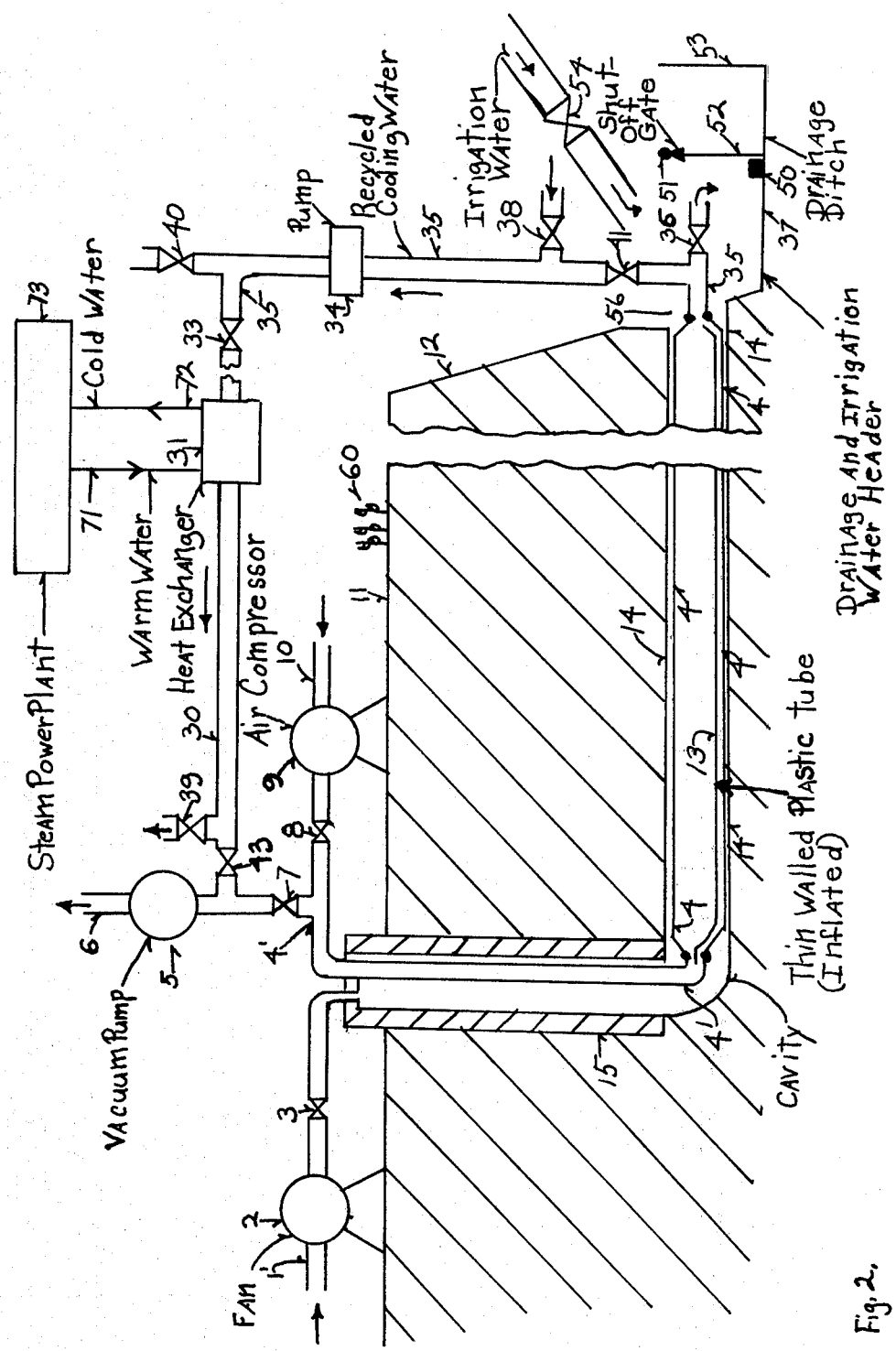
FIG. 2 shows the invention with the tube inflated.

More important is the fact that if tube 4 is later expanded as shown in FIG. 2 and used to cool water by the cooling effect of the ground the heat transfer between the ground and the tube 4 will be much faster.

The following chart is copied from the magazine Heating, Piping & Air Conditioning page 83, January 1947.

| Material | Density lb/cu ft | K (BTU) (ft) (hr) (ft$^2$) (°F.) |
|---|---|---|
| Soil, dry | 64.0 | 0.1–0.3 |
| Soil, average | | 0.3–0.5 |
| Soil, soaked | | 0.5–1.5 |
| Clay Soil, dry | | 0.5 |
| Clay Soil, moist | | 0.6–0.9 |
| Clay Soil, wet to soaked | | 1.0–1.5 |
| Sandy Soil, dry | 95.0 | 0.2–0.65 |
| Sandy Soil, moist | 102.0 | 0.65–1.2 |
| Sandy Soil, wet to soaked | | 1.2–2.4 |

Obviously from the above table the drying out of the soil, as occurs during drouths, especially with high water using crops like corn, generally reduces the rate of heat transfer between the soil and the buried tube. And on the average the heat transfer is increased by a factor of 3 and only a third as much area of tubes is required roughly when soil is wet than when it is dry. This is an enormous advantage for heat transfer between the soil and heat buried tubes. Also it is evident that the low heat transfer coefficients K of soil will be counterbalanced by a reduction of the distance the heat has to be transferred before the area it is transferred through is greatly increased. In other words heat transferred per hour is not only proportional to the heat transfer constant K but also the distance from the tube where the cross sectional area, the heat has to be transferred through, greatly increases. This is the advantage of the small tube where the heat from the surface of an 0.25 inch diameter tube only has to be transmitted 0.125 inch from the tube before the area through which the heat is transmitted doubles and the overall resistance to transfer of heat at the distance from the tube is halved.

The above shows the advantage of using small diameter tubing when one considers heat transfer from the tube to the earth around it.

It can be seen that the combination of very low cost small diameter tubing combined with an inherent advantage of keeping the soil moist or even wet is an enormous advance in the art. Local conditions will vary widely depending on the types of soil and the amount and type of cooling needed. But systems of less than 10% and sometimes less than 3% of the cost of competitive buried tube systems are provided by the invention.

I show in FIG. 2 the use of the buried plastic tube 4 for cooling the warm water from steam power plant 73. The warm water from steam power plant 73 has been used to cool the steam from the turbines and normally must go through expensive cooling towers to be cooled by the air directly from the atmosphere which, when everybody's air conditioner is going on a hot humid afternoon, is much hotter than 18 inches deep in the ground. And the cooling tower can cause long plumes, that while actually not harmful, are usually not liked by neighbors. It shows its neighbors which way the pollution is going which may be over you. It can cause traffic accidents in rare occasions. Also a power plant so benefits by being less visible anywhere and an underground cooling system completely eliminates the normally enormous cooling towers.

For a given power plant normally quite a number of tubes like tube 4 would be used and only tube 4 is shown in FIG. 2. Water from the power plant 73 would pass by pipe line 71 to heat exchanger 31 where it would be cooled and pass back to steam power plant 73 by pipe line 72. Valves 43, 7, 41, and 33 would be open and by means of pump 34 water would be passed from heat exchanger 31 by pipe line 30 through pipe 4', tube 4, pipe 35, pump 34 and valve 33 back to heat exchanger 31. Valves 36 and 40 are used to fill the flow system just described, and when desired, drain the water from the cyclic system just described when it is desired to deflate the tube 4 and use the cavity 14 for drainage.

Valves 38 is used to introduce water cooled by other thin walled plastic tubes used similar if not identical to tube 4 just mentioned. And the water so introduced, after use in heat exchanger 31 for cooling warm water from the steam power plant 73, returns to those last mentioned tubes similar to tube 4 by pipe line 30 and valve 39.

Instead of a steam power plant 73 providing the warm water to be cooled and returned, the warm water could come from a home owner's air conditioning system. And tube 4 would make the cavity 14, with the cavity 14 draining the home owner's yard or garden or both.

In all cases dependability of the cooling required would be obtained easily by using a plurality of tubes like tube 4. This would allow tubes to be switched from cooling to draining and vice versa with plenty of spare tubes. A tube that was used for June for draining could still have its cooling capacity from earlier cool spells taken advantage of in July.

Also in winter obviously the buried tubes could be used to supply the heat for heat pumps. The use of heat pumps with buried pipes can be found in the article previously referred to. (It is the article from which the thermal conductivity of soil K has been taken and reprinted in this patent.)

With many soils that need drainage there is the problem of what is called puddling. That is compaction of the soil is caused by pressure on the soil when it is wet. This makes the soil difficult to drain. Freezing tends to break up the compaction of soils. Of course the amount of compaction of the soil when the disclosed tube is inflated greatly decreases with decrease in diameter of the tube inflated. Also soils like in old fence rows, that have rarely been plowed, are very much less subject to compaction while wet than the average Corn Belt soil. For soils and tube diameters that compaction is suspected might occur, and in fact in any case where the tubes are not placed as close together as 10 feet it is a good idea to take some earth from an old fence row and put a good pound per foot along the outside of the tube when the tube is inserted in the ground. This extra good ground is just poured over the tube while it is exposed when the tube is installed by first plowing out a furrow or by ditching out a ditch. Or, when the tube is installed by the equipment used to knife in telephone cables, flowing a slurry of the good soil in water into the opening with the telephone cable is recommended.

The earth from the old fence row, or equivalent, is sieved to remove roots and pebbles.

I claim:
1. A method for draining land which comprises:
    (a) burying a flexible tube in a substantially horizontal position beneath the surface of the ground,
    (b) then after the tube is placed below the surface of the ground forcing fluid into an end of the tube and thereby increasing the internal volume of the tube, said increase in volume being below the surface of the ground,
    (c) then after step (b) in which fluid is forced into the tube, deflating the tube by removing fluid from inside the tube by submitting an end of the tube to a pressure less than the pressure at a point that is both outside the tube and contacts said tube, said point being under the surface of ground being drained,
    (d) then after step (c) forcing into an end of the tube a fluid inside the tube and thereby inflating the tube and increasing its internal volume below the surface of the ground,
    (e) then after the inflation of the tube removing fluid from the tube so the volume, the tube occupies, decreases in volume and there is left because of this decrease in volume a cavity around the tube that is open the length of the tube and to an outlet at the end of the tube, that is open for water to drain out of,
    (f) after the mentioned inflation and deflation in steps (d) and (e), draining water through the cavity around the tube to the outlet at the end of the tube and out of the cavity to the outlet,
    (g) after the preceding steps, and after the rate of drainage from the cavity has decreased after rains, repeating both the inflation and deflation steps so as to increase the rate of drainage from the cavity after rains.
2. A method according to claim 1 in which air from the atmosphere above the ground is forced by mechanical means into the cavity around the tube so that the air passes up through the ground above the cavity and aerates plants growing above the cavity.
3. A method according to claim 1 in which water is cooled by forcing the water through the tube, during times when the ground around the cavity which the tube is in is cooler than the water, then passing the cooled water through a heat exchanging step in which the cooled water preforms desired cooling and in which the temperature of the cooled water rises, and the water then is cooled again by forcing the water through a tube buried in the ground and then used again for cooling in a heat exchanging step.

4. A method according to claim 3 in which water is introduced into the cavity through an outlet of the cavity so as to moisten the walls of the cavity and so maintain a higher thermal conductivity of the ground around the cavity during periods of dry weather.

5. A method according to claim 1 in which water is introduced into the cavity through an outlet of the cavity to provide water needed by crops growing on the surface of the ground above the cavity.

6. A method according to claim 1 in which the tube is deflated before and during insertion in the ground.

7. A method according to claim 1 in which the steps (d) and (e) are carried out and required due to equipment running over the cavities.

8. A method according to claim 7 in which the tube is deflated before and during insertion in the ground.

* * * * *